United States Patent [19]
Barile et al.

[11] Patent Number: 5,920,059
[45] Date of Patent: *Jul. 6, 1999

[54] TWO-DIMENSIONAL BAR CODE SCANNER INTERFACE

[75] Inventors: John Barile, Holbrook; Hal Charych, East Setauket; Steven Chew; James Geibel, both of East Northport, all of N.Y.

[73] Assignee: Symbol Technologies, Inc., Holtsville, N.Y.

[ * ] Notice: This patent is subject to a terminal disclaimer.

[21] Appl. No.: 09/060,083

[22] Filed: Apr. 14, 1998

Related U.S. Application Data

[63] Continuation of application No. 08/381,045, Jan. 31, 1995, Pat. No. 5,789,728, and a continuation-in-part of application No. 08/110,667, Aug. 23, 1993, abandoned.

[51] Int. Cl.⁶ ...................................................... G06K 7/10
[52] U.S. Cl. .................................. 235/462.07; 235/462.01
[58] Field of Search ....................................... 235/462, 472, 235/463, 454, 462.07, 462.13, 462.01, 472.01

[56] References Cited

U.S. PATENT DOCUMENTS

| | | |
|---|---|---|
| 4,360,798 | 11/1982 | Swartz et al. . |
| 4,736,095 | 4/1988 | Shepard et al. . |
| 4,760,248 | 7/1988 | Swartz et al. . |
| 4,933,538 | 6/1990 | Heiman et al. . |
| 5,081,342 | 1/1992 | Knowles et al. . |
| 5,140,146 | 8/1992 | Metlitsky et al. . |
| 5,157,687 | 10/1992 | Tymes . |
| 5,179,270 | 1/1993 | Taussig et al. . |
| 5,235,167 | 8/1993 | Dvorkis et al. . |
| 5,247,161 | 9/1993 | Actis et al. . |
| 5,258,604 | 11/1993 | Behrens et al. . |
| 5,446,271 | 8/1995 | Cherry et al. ............................ 235/462 |
| 5,449,891 | 9/1995 | Giebel ..................................... 235/462 |

FOREIGN PATENT DOCUMENTS

| | | |
|---|---|---|
| 0164012 | 12/1985 | European Pat. Off. . |
| 0384955 | 9/1990 | European Pat. Off. . |

*Primary Examiner*—Donald Hajec
*Assistant Examiner*—Karl Frech

[57] ABSTRACT

An interface between a two-dimensional bar code scanner and a host digital decoder is provided through a 15-pin electronic connector, which transfers to the decoder an actuating signal either from a scanner trigger switch or from an external device. In response, the digital decoder provides the scanner with operating power. The scanner generates and relays a bar code signal and a scanning direction signal back to the digital decoder, which uses these signals to identify a bar code being scanned as a one-dimensional or two-dimensional code. If the bar code is determined to be a two-dimensional code, upon detection of laser pattern alignment with the label the digital decoder sends a scanning control signal to the scanner to control a laser pattern generated by the scanner.

21 Claims, 11 Drawing Sheets

TRIG1:

TRIG2:

EXTRIG:

SOS:

DBP:

DECODE:

TWO-DIMENSIONAL BAR CODE SCANNER INTERFACE

This application is a continuation of U.S. application Ser. No. 08/381,045, filed on Jan. 31, 1995 and issued as U.S. Pat. No. 5,789,728 on Aug. 4, 1998, which is a continuation-in-part of U.S. application Ser. No. 08/110,667, filed on Aug. 23, 1993, now abandoned.

TECHNICAL FIELD

This invention relates generally to a bar code scanning and decoding system capable of reading a number of different one-dimensional and two-dimensional bar codes, and more particularly, to a method of and apparatus for interfacing a bar code scanner and a decoder in such a system.

BACKGROUND ART

A bar code is a particular type of machine readable symbol, which includes parallel solid lines or bars of varying width and spacing. The alternating light and dark areas defined by the bars and the spaces between the bars represent a digital code which serves to identify the content of the bar code symbol. Labels bearing information in a number of different bar code formats are used in various applications, for example, to encode product identification information. Bar code labels are used on a broad range of retail packages for bar code reading and inventory purposes.

A bar code is read by a scanner, in which a beam of light is swept in a scan pattern to find and read a bar coda printed an a surface exposed to the scanner. A scanner may be located at the check-out station in a retail establishment to provide a clerk with a product identification information. A scanner of this type includes a laser sources, such as for example a gas discharge laser, which produces a laser beam pattern. The laser beam is directed to the surface of a bar code label and is swept across the surface by a motor-driven mirror assembly. The reflected light is sensed by a photosensitive element. Since light areas or spaces reflect more light than dark areas or bars, the reflected light intensity represents the digital code, which serves to identify the content of the bar code symbol. The digital code is decoded by a decoding system, which provides the product identification information.

While such an arrangement greatly enhances the efficiency of the check-out process difficulties are encountered in the scanning and decoding operations due to the number of different bar codes currently in use. For example, the scanning and decoding system must be capable of recognizing and decoding labels printed in one-dimensional bar codes as well as in two-dimensional bar codes. It is important that the system be capable of accomplishing this task automatically, without intervention by an operator, even when bar code labels having geometric pattern of different orientations are affined to products which are scanned.

In view of the above it would be desirable to provide a method of and apparatus for interfacing a bar code scanner and a bar code decode so as to automatically read a plurality of different one-dimensional and two-dimensional bar codes.

DISCLOSURE IF THE INVENTION

Accordingly one advantage of the invention is in providing a method of and apparatus for interfacing a bar code scanner and a bar coda decoder in a system capable of recognizing and reading bar codes having geometrical patterns of different orientations.

Another advantage of the invention is in providing automatic recognition reading (and decoding of different one-dimensional and two-dimensional bar codes.

The above and other advantages of the invention are achieved, at least in part, by providing an interface between a scanner forming a digital code representing a target being scanned and a decoder for decoding the digital code, to transfer data and control signals used to operate the scanner and the decoder in any one of their various modes. In particular, the interface provides transferring an actuating signal from the scanner to the decoder. In response, the decoder sends an action siganl to the scanner to activate the scanner. For example, the decoder may provide power for operation of a scanning mechanism and scanner electronics. The scanner generates and transfers the digital code signal and a scanning direction signal to the decoder. The decoder uses these signals to determine the type of the target and relays a scanning control signal back to the scanner, when the digital code signal and the scanning direction signal indicate that the target requires the scanner to modify the scan pattern. For example, the scanning control signal may set a mode of two-dimensional scanning or modify the scan amplitude. When the code is decoded, the decoder transfers an acknowledge signal to the scanner. The scanner may use this signal to produce audible and/or visual indications of the decoding status. Also, this signal may be used to present any of various system conditions including successful decoding, a system error or a special condition.

In accordance with a preferred embodiment of the invention, the scanner scans a bar coda signal label to produce a digital bar coda signal representing bare and spaces of the bar coda label. The scanning control signal is transferred to change am scanning pattern if the digital bar coda signal and the scanning direction signal indicate that the bar coda comprises a two-dimensional component. The scanning control signal is used to linearly control the two-dimensional size of the scan pattern.

In accordance with a particular aspect of the invention, the interfaces provides actuating of the decoder, when the scanner is triggered either locally by a scanner switch or remotely by an external triggering device.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light across it and detecting reflected or scattered light as a representation of variations in light reflectivity at various points of the pattern or information. A bar code is one example of "indicia" which the present invention can scan, preferably by using an optical reading unit in the form of a small moving spot laser beam scanner. The best mode for carrying out the invention is based on the realization that the target being scanned by the scanner comprises any one of various bar codes.

Figure 1:
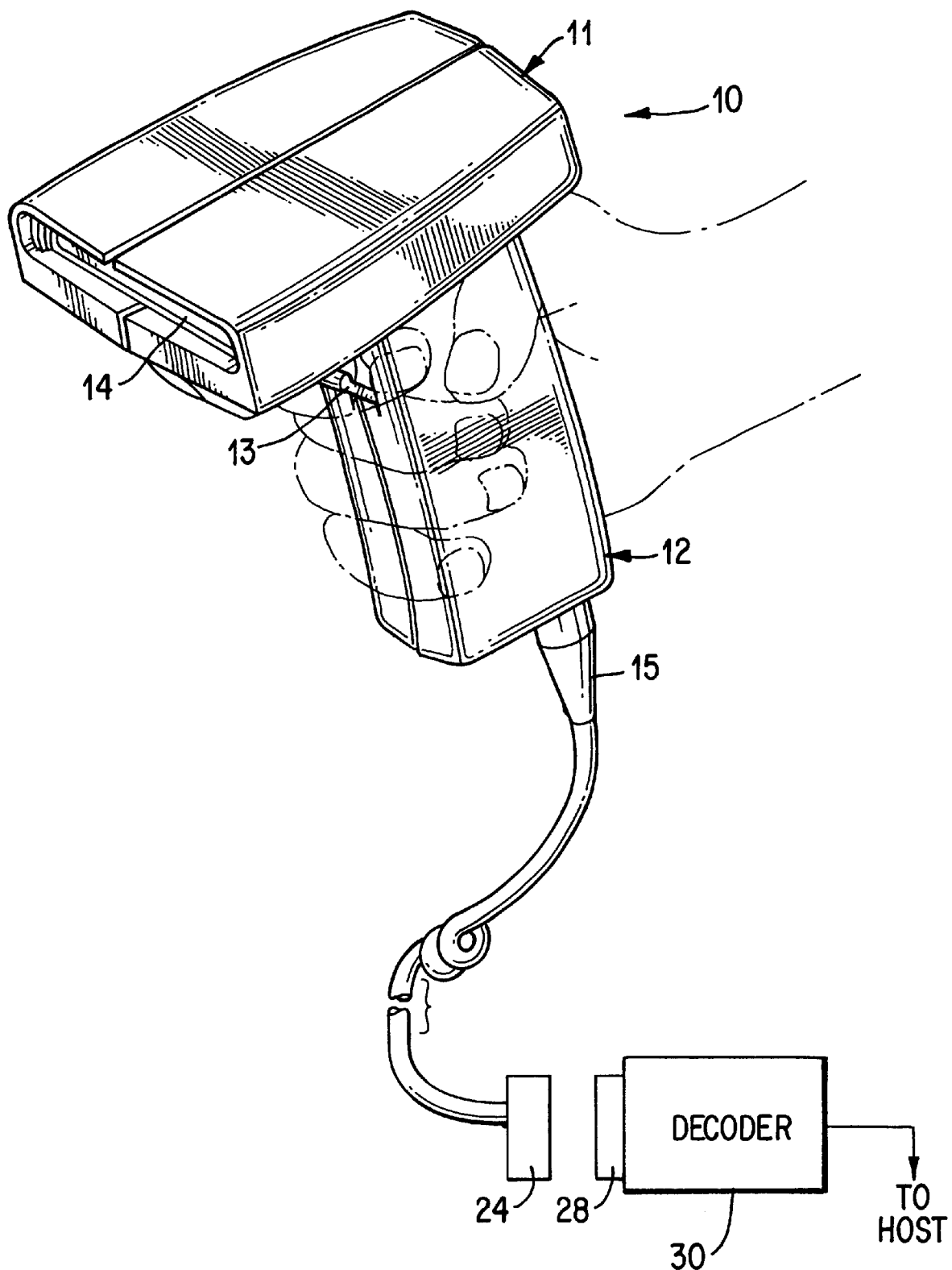
FIG. 1 is a schematic diagram showing an interface between a bar code scanner and a digital decoder according to the preferred embodiment of the present invention.

Referring to FIG. 1, a laser bar code scanner 10 producing a digital bar code signal and transmitting it through a flexible cable 15 is coupled to a fifteen position plug 24 connectable to a socket 28 of a digital decoder 30 for decoding the bar code. The socket 28 is located on the digital decoder electronics printed circuit board (not shown). Signal exchange between the scanner 10 and the decoder 30 is enabled by mating the plug 24 and the socket 28.

The portable scanner 10 comprises a housing having a pistol grip 12 and scanner head 11, with window 14 for passing am scanning beam to impinge on indicia to be scanned and reflected light to be converted to an electrical signal and processed. Operation of the scanner is responsive to manual operation of a trigger 23. Fixed mount, non-portable, embodiments are also possible. Laser scanner systems and components of the type exemplified by U.S. Pat. Nos. 4,252,798, 4,360,790, 4,369,361; 4,387,297; 4,593,186; 4,496,831; 4,409,470; 4,460,120; 4,607,156, 4,673,803, 4,736,609, 4,075,007, 4,081,660, 4,808,804; 4,816,661, 4,760,248, 4,871,904, 148,669 and 147,708, all of which are owned by the assignee of the instant application, are incorporated herein by reference.

Figure 2:
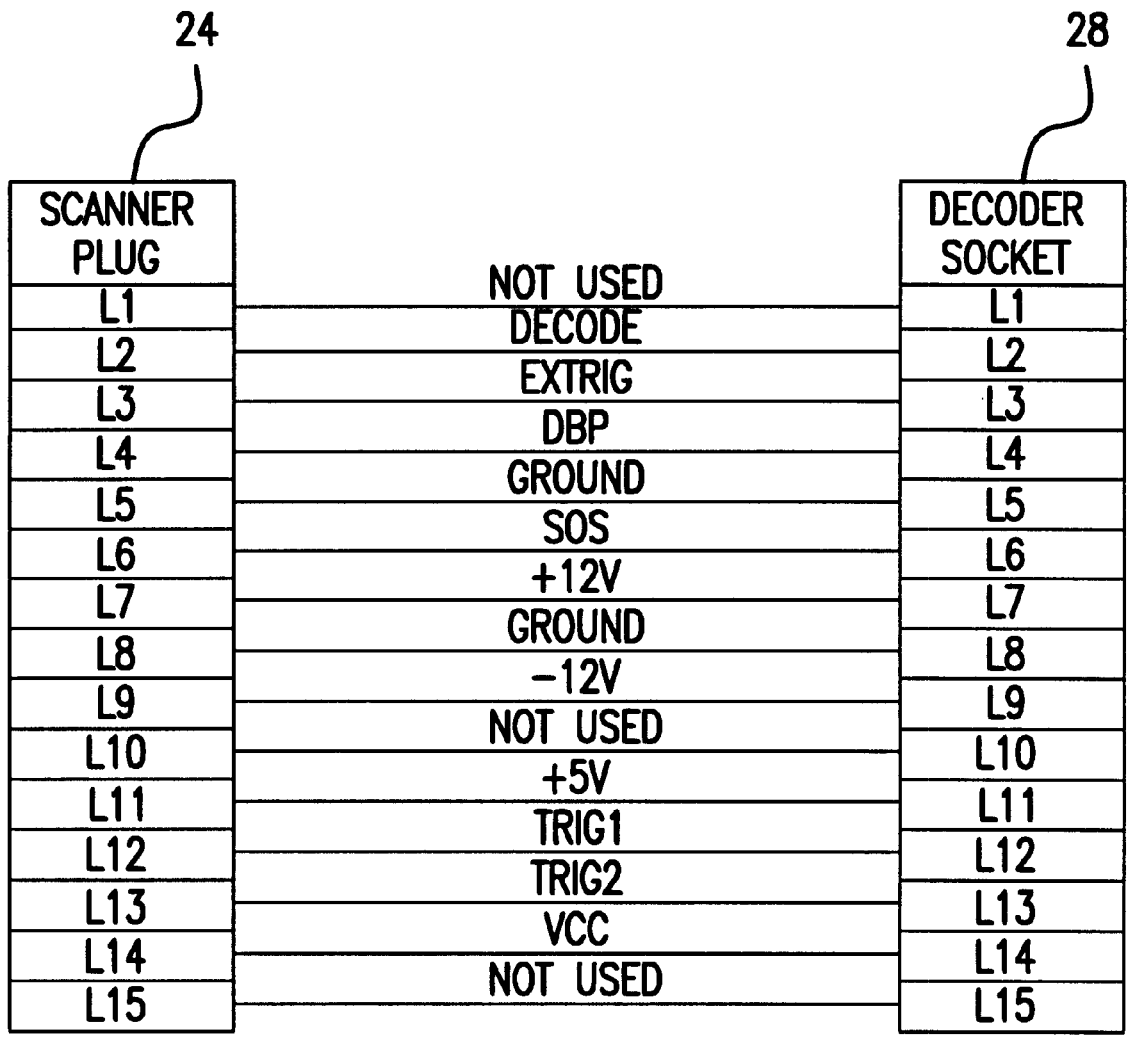
FIG. 2 is a diagram representing a bus structure of the interface shown in FIG. 1.

As shown in FIG. 2, an interface between the scanner 10 and the decoder 30 consists of fifteen lines. Lines 1, 10 and 15 are not used. Line 2 provides transfer of a DECODE signal, which is a digital pulse train signal transmitted by the decoder to the scanner and used as a drive for an audible or visual indicator of the scanner. Line 3 transfers to the decoder an EXTRIG signal used as an alternative actuating trigger input. Line 4 is used to transmit from the scanner to the decode a digital bar pattern (DBP) signal, which represents the bars and spaces of the bar code being scanned by the laser scanner. Line 5 as well as line 8 provides the scanner with electrical ground potential. Line 6 transfers from the scanner to the decoder a start of scan (SOS) signal, which represents the relative scanning direction of the laser pattern during a scanning session. Lines 7 and 9 respectively provide the scanner with +22 V and −12 V voltage for operation of scanning mechanism. Line 11 provides the scanner with +5 V voltages for operation of scanner laser electronics. Line 12 transmits from the scanner to the decoder a TRIG1 signal, which represents the position of the scanner trigger switch. Line 13 transfers from the decoder to the scanner a TRIG2 signal used to control the laser scan pattern generated by the scanner. Line 14 represents source voltage VCC used on the decoder and made available externally to provide power to supporting equipment.

Figure 3:
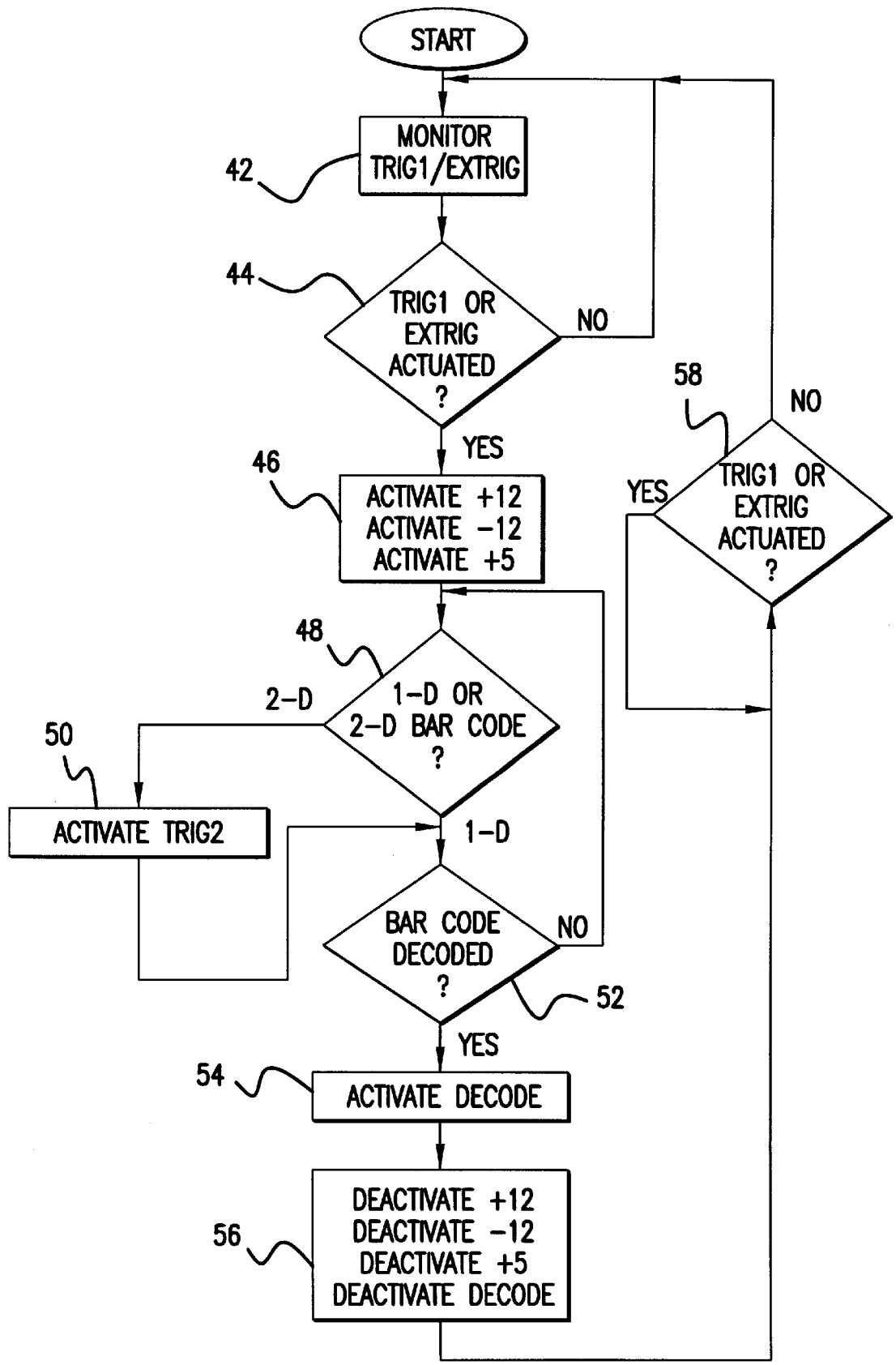
FIG. 3 is a flowchart illustrating signal exchanges through the interface shown in FIG. 1.
Figure 4A:
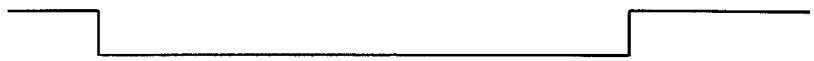
FIGS. 4a–4g are diagrams showing the waveforms of various signals transmitted through the interface.
Figure 4B:
Figure 4C:

The flow-chart of signal exchange between the scanner and digital decoder through the interface of FIG. 2 is shown in FIG. 3. The digital decoder constantly monitors its TRIG1 and EXTRIG trigger inputs at step 42. The TRIG1 input activates the decoder when a local scanner trigger switch is turned on. The EXTREG input is used to trigger the decoder from an external device such as an object sensor or foot switch. The format of the TRIG1 and EXTRZG signals is respectively shown in FIGS. 4a and 4c. These signals are normally at a high logic level and become low when the local or external triggering device is pulled. The change in polarity of one of the inputs TRIG1 or EXTRIG is detected by the decoder electronics at step 44 to activate and transmit to the scanner the source voltages +12 V, −12 V and +5 V at step 46. These source voltages sill be active until the scanning process is completed either by successful decoding, deactivation of the trigger input, or a preset tire limit of the scanning process set by the digital decoder. The latter two conditions are not represented in the flow chart since they do not present a full example usage of the interface. The GROUND connections are always in affect as long as the plug 24 and socket 20 are properly mated.

Figure 4D:
Figure 4E:
Figure 4F:
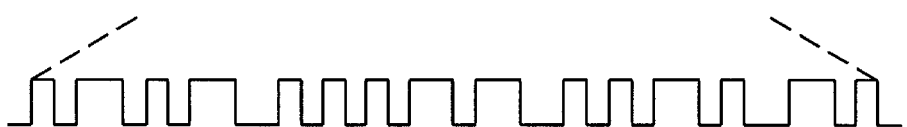

Once the scanner is activated, it generates and relays the DBP and SOS digital signals back to the digital decoder. The formats of the exemplary SOS an DBP signals are respectively shown in FIGS. 4d and 4e. The enlarged portion of the exemplary DP signal is depicted in FIG. 4f. The DBP signal represents the bars and spaces of the bar code being scanned by the laser scanner. The DP pattern shown would be the result of scanning the characters "STI" encoded in a Code 39 bar code. The high level corresponds to black bars and the low level to white spaces. The SOS signal represents the relative scanning direction of the laser pattern during a scanning session. The decoder uses the DP and SOS signals to determine at step 48 if the bar code being scanned is of a standard one-dimensional (1-D) type or of two-dimensional (2-D) type, for example PDF417 type. This procedure is described in more detail later. If the decoder determines that the scanned bar code is a 1-D type, it will proceed to decode the bar code. If the bar code is determined to be a 2-D code, the decoder activates the TRIG2 signal (FIG. 4B) at step 50 to enable the scanner to generate the laser raster pattern. The decoder controls the amplitude of the y-axis component of the raster pattern by controlling the duty cycle of the TRIG2 signal. Full, non-pulsed, activation of TRIG2 yields the largest y-amplitude. Changing the duty cycle of TRIG2, while it is active produces pulsing (growing and shrinking) of the raster pattern. Then the decoder proceeds to decode the bar code. Alternatively, the TRIG2 signal can be generated when the scanner user presses the scanner trigger switch to a second detente position thereby allowing the scanner to produce the laser raster pattern and informing the decoder that it has done so. The TRIG2 signal is delayed with respect to the TRIG1 or EXTRIG signals by a certain amount whether it is activated by user trigger actuation or by the decoder.

Figure 4G:

The next step 52 is to determine whether or not the bar code is decoded. When a candidate bar code is successfully decoded by the digital decoder, it activates the DECODE signal (FIG. 4g) at step 54 to drive an audible or visual indicator of the scanner in order to produce audible and/or visual indications of the decoding process status. The decoder may also use this signal to present any of various system level conditions including successful decoding, a system error or a special condition. The periodic pulse waveform of the DECODE signal as well as the widths of the individual pulses is adjustable to produce beeps and/or tones of varying pitch and duration. Then, the digitial decoder deactivates the source voltages and DECODE signal at step 56. The TRIG1 and EXTRIG trigger signals are monitored at step 58 to determine whether the current actuation of the trigger inputs has been reset to its idle state. The digital decoder continues to monitor the trigger inputs and remains in this state until the trigger inputs return to the inactive state. Once the trigger inputs are returned to the inactive state, the decoder begins to monitor the TRIG1 and EXTRIG signals for the start of the next decoding process.

Figure 5:
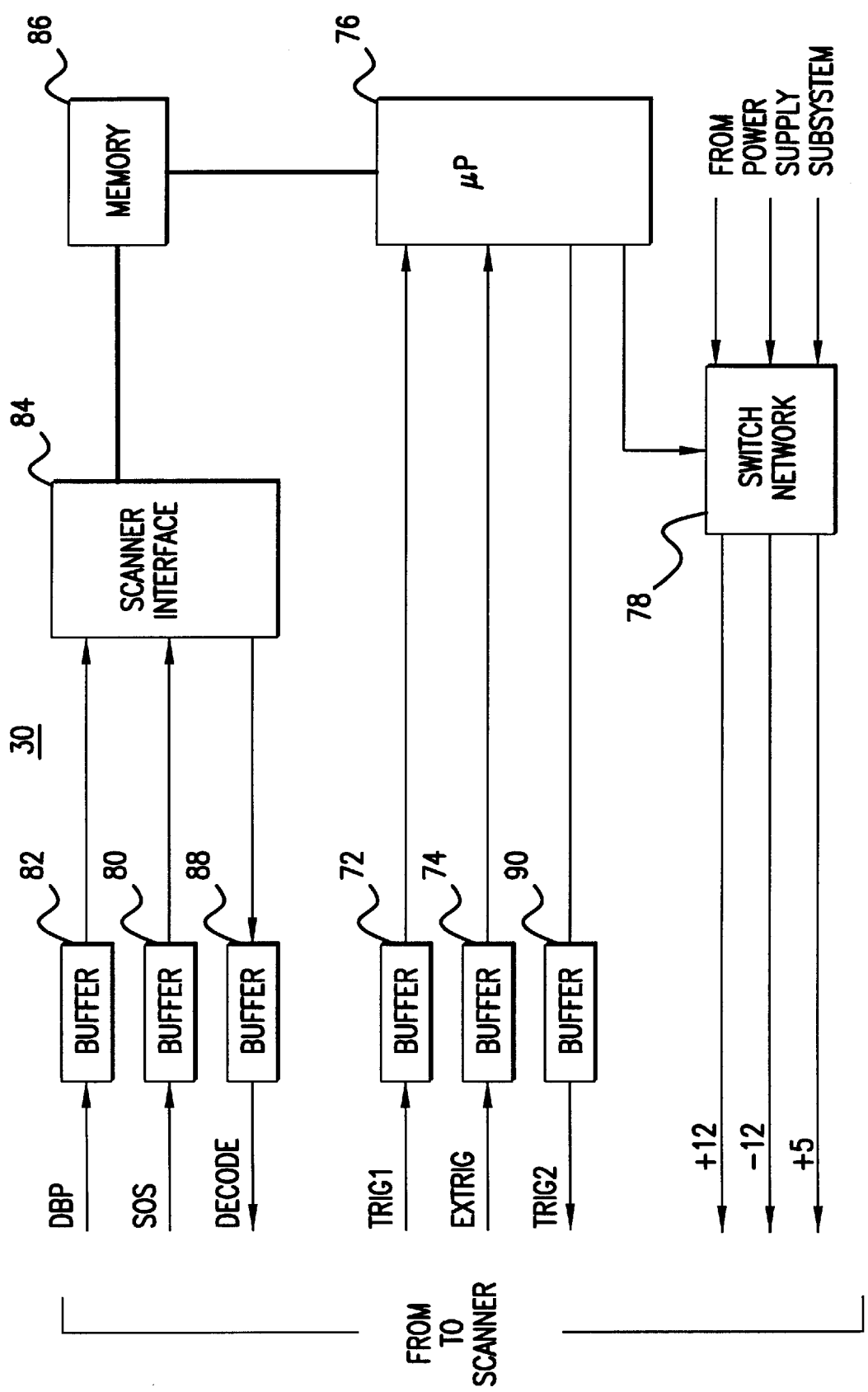
FIG. 5 is a blocks diagram of the part of the digital decoder shown in FIG. 1 concerned with the scanner interface.
Figure 6A:
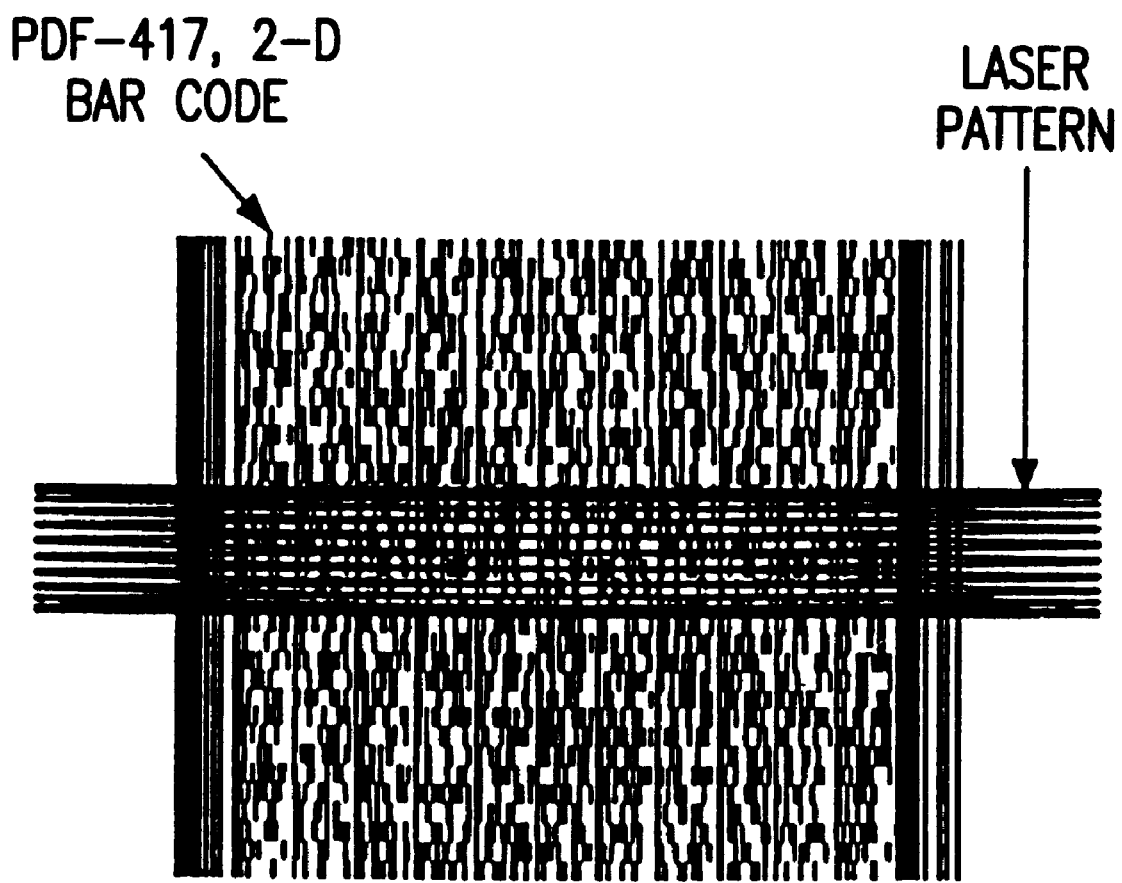
FIGS. 6a and 6b show an exemplary 2-D bar code and laser patterns generated by the bar code scanner to scan a bar code label.

Reference is now made to FIG. 5, showing the digital decoder 30 of FIG. 1 in more detail. A mentioned previously, in the idling state the decoder 30 monitors the TRIGl and EXTRIG signals, which are conditioned by respective buffers 72 and 74 and supplied to a microprocessor 76. When the TRIGl or TRIG signal goes from normally inactive high to an active low state, the microprocessor 76 enables a switch network 78 to transfer the power supply signals +12 V, −12 V and +5 V from a power supply subsystem to the scanner. The +12 V and −12 V voltages power the mechanical scan element inside the laser scanner 10, which generates the small (slab) laser pattern shown in FIG. 6a and the raster laser pattern in FIG. 6b. The scanner laser is turned on by the +5 V voltage and allows the user to scan the laser pattern onto a desired target.

While scanning, the scanner generates the SOS and DBP signals which are supplied to a scanner interface circuit 84. The SOS and DBP signals may be inverted by respective inverting logic gates represented by buffers 80 and 82. The scanner interface circuit 84 is coupled to a system memory 86.

Figure 7:
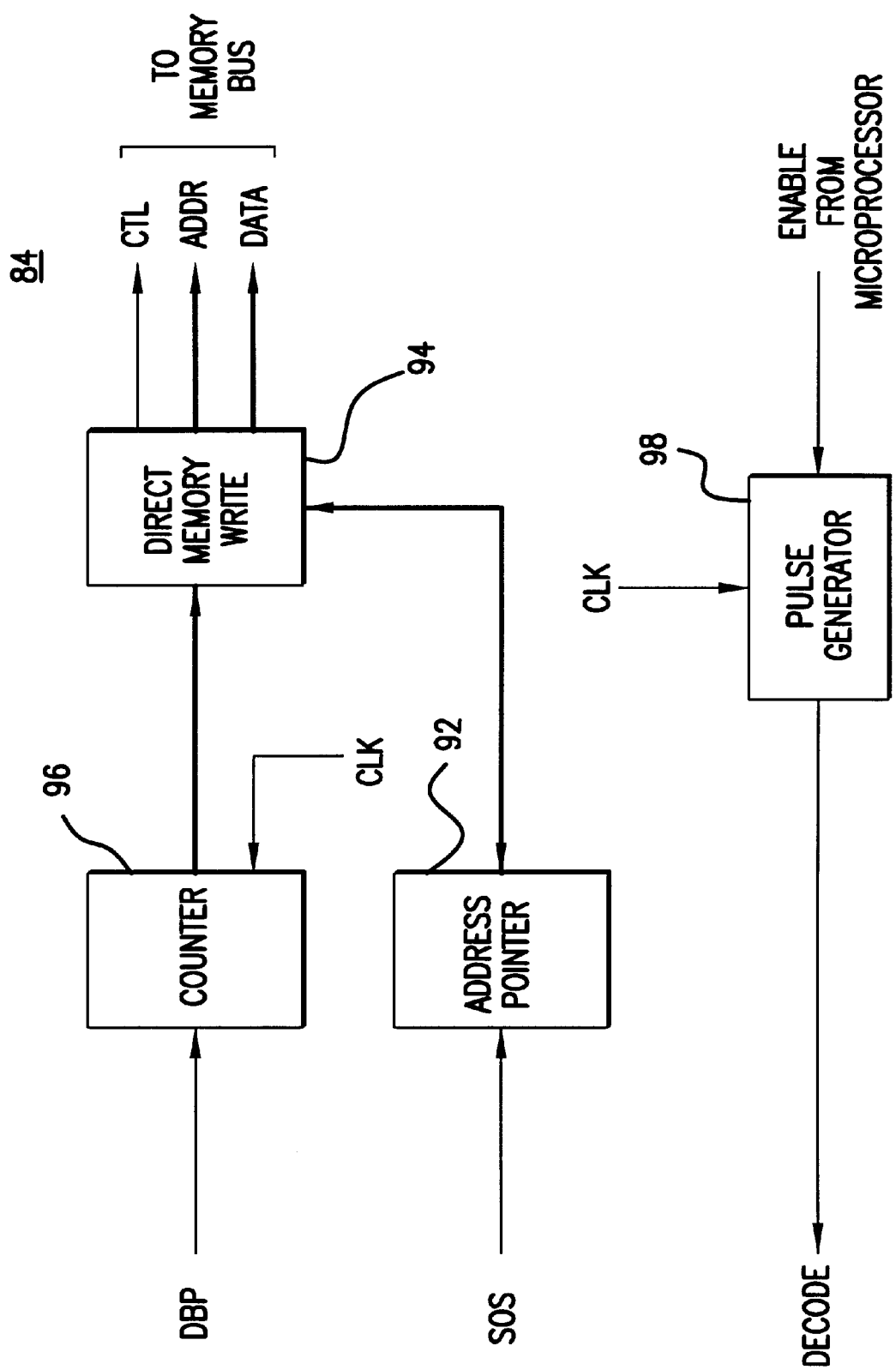
FIG. 7 is a block diagram of a scanner interface circuit shown in FIG. 5.

Referring to FIG. 7, the scanner interface circuit 84 comprises an address pointer 92 which performs two functions: 1) keeping track of how many transitions of the DBP signal occur during a scan, and 2) generating a memory address pointer to store the DBP data in a memory location where the microprocessor 76 can get it for each sequential scan. The address pointer 92 is initially set for the memory location where the first DBP value of a new scan will be stored and then counts up with such new DEP value that is stored. Each new scan is indicated by the SOS signal transition to a low level if the SOS signal was high or to a high level if it was low (see FIG. 4d.) An enlarged exemplary portion of the DBP signal corresponding to a scan is shown in FIG. 4f. At the start of a scan, the address pointer 92 requests a direct memory write (DMW) block 94 to store the address of the first DEP value of this new scan (scan-data pointer) in a separate memory area. As more scans occur, a list of the seen-data pointers is formed.

The binary values of the DBP signal are generated by a counter 96, which is reset to zero with each new transition of the DBP signal and counts system clock signals CLK. When a subsequent DBP signal transition occurs, the count value of the previous DBP internal is latched, the counter is reset to zero and the count continues for the new DEP interval. The counter 96 requests DMW 94 to take the completed DBP count value and store it into the system memory. The current data address in the address pointer 92 indicates the memory location for storing the DEP count value. This process continues as long as transitions occur on the DBP input line.

The first DBP value for a new scan is stored in the memory location pointed to by the scan-data pointer. Each subsequent DEB is stored sequentially in the memory locations following the scan-data pointer value set for this scan. Each new scan initiates a new scan-data pointer usually set to one location higher than the last DBP location of the previous scan. Since the scanner interface circuit 84 also stores the memory address of the starting point for each new scan (scan-data pointer) in a separate memory area, the microprocessor 76 can locate the start of a new scan of data (first DBP value) by looking at this list of scan-data pointers.

The microprocessor 76 analyzes the DBP values to determine whether they represent valid bar code sequences or useless patterns. When the valid bar code is decoded, the microprocessor 76 forms a control bit, which enables a pulse generator 90 to generate the DECODE signal buffered by a logic gate 8 (FIG. 5 and forwarded through the interface to the scanner. To produce the DECODE signal, the pulse generator 90 divides a system clock signal until the desired audible fundamental frequency is formed at the output. As mentioned above, the DECODE signal may be used to drive an audible or visual indicator of the scanner in order to present any of various system level conditions including successful decoding, a system error or a special condition.

Also, the microprocessor 76 uses the DBP and SOS signals to determine if the bar code being scanned is of a standard one-dimensional (1-d) type or of two-dimensional (2-D) type, for example a PDF417 type. If the bar code is determined to be a 2-D, the decoder activates the TRIG2 signal buffered by a buffer 90 and transferred to the scanner. By varying the duty cycle of the TRlG2 signal, the decoder controls the opening rate and the amplitude of the y-axis (see FIG. 6b), thereby optimizing the two-dimensional scan pattern for each particular symbol that is scanned.

Figure 8:
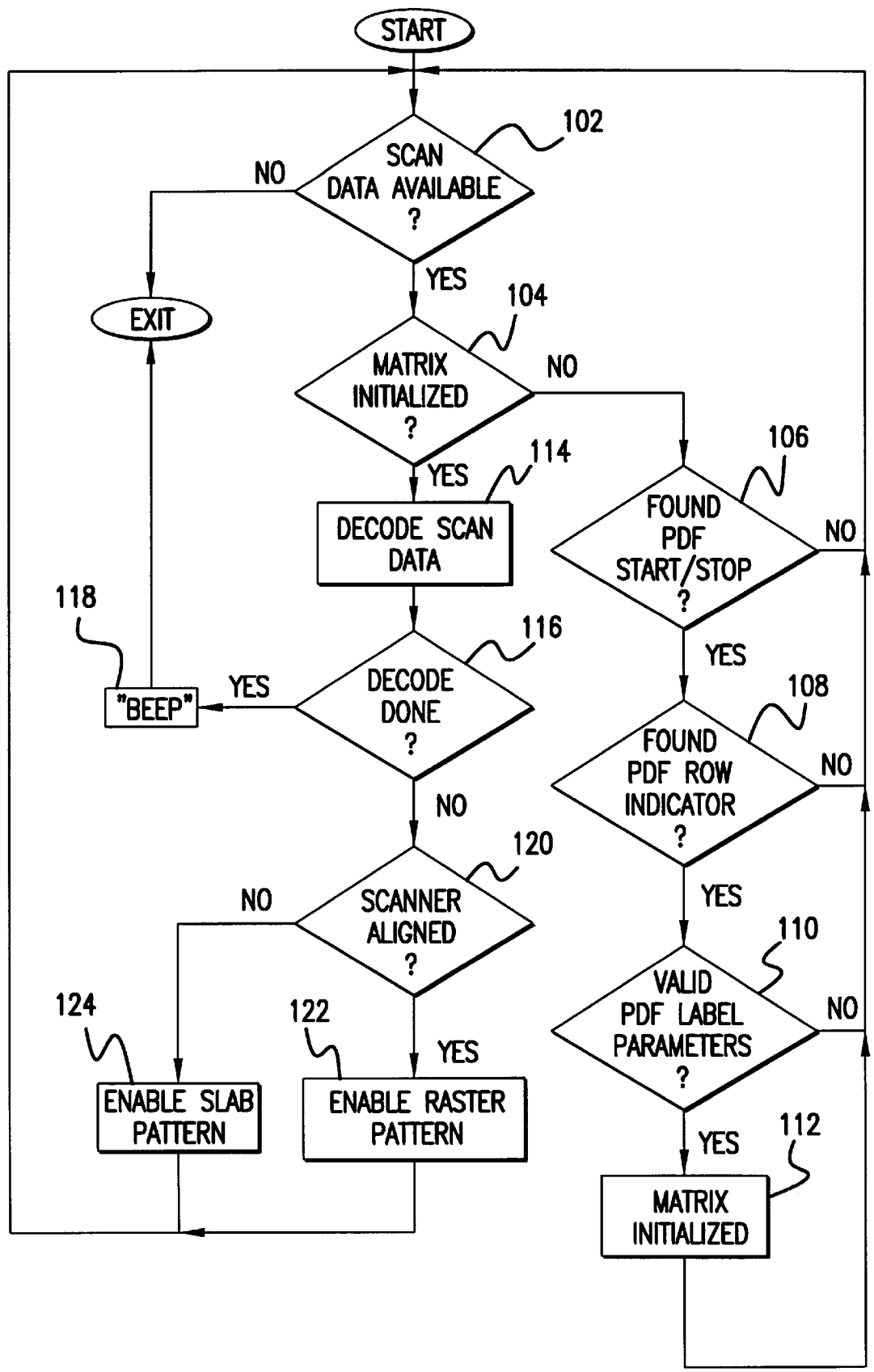
FIG. 8 is a flow chart of a 2-D bar code recognition procedure.

Reference is now made to FIG. 8 showing a flow-chart of the 2-D bar code recognition procedure. The 2-D PDF417 bar code as well as the 1-D bar codes is recognized automatically by the decoder while the decoding is in process. As mentioned above, when the 12 V voltages are initially supplied to the scan element, it generates the slab laser pattern shown in FIG. 6a. The slab laser pattern is sufficient to obtain the bar-space sequences from a 1-D bar code. Simultaneously, the decoder looks for the patterns that indicate the existence of a PDF417 label. If scan data at step 102 are available, the decoder checks at step 104 is a PDF417 label has been recognized. If not the decoder looks at step 106 for the characteristic start and/or stop patterns at the beginning and end of the PDF417 label. If this search is successful, the row indicator characters are sought at step 108. If not, a new scan is processed. As indicated in the PDF417 symbology specification, the row indicators contain the number of rows in the label, the number of columns in the label, the row number of the particular row being scanned and the security level (amount of error correction encoded into the label). As a bar minimum, if the decoder recognizes the start/stop characters, it determines that a PDF417 label is being scanned, since no other bar code symbology has the same sequence of characters.

If the row indicators are found at step 108, the information contained in them is extracted and used to initialize a matrix of rows and columns representing the bar code label being scanned. To further ensure that the label is a PDF417, the two indicators from at least two different rows must be processed successfully in order to obtain the information necessary to formulate the matrix configuration of the label being scanned. As each new row indicator from successive scans is processed, the decoder updates the matrix information about the PDF417 label being scanned. When the decoder at step 110 makes a decision that it has enough information to fully characterize the label, it deems the matrix initialized (step 112).

As subsequent scans are processed, the decoder checks at step 104 that the matrix is initialized and proceeds to decode the scan data at step 114. If enough scans have been processed to fully decode the bar code label (step 116), the decoder in italicizes at step 118 the DECODE signal (FIG. 4g) to produce a beep or tons output and exits this processing routine. If not, the decoder checks at step 120 whether or not the scanner is aligned with the PDFI47 label. The scanner is considered to be aligned when the laser pattern can scan and the decoder can decode at least one complete PDF417 codeword in the label without crossing from one row to another. This does not include the start/stop or row indicator characters. Furthermore, the better the alignment, the confidence level weight) of the decoded codeword is higher. If a codeword is decoded from the same row as its nearest left and right neighboring codewords, it is deemed to have a high decode confidence level. If the scan line is not aligned with the bar coda, adjacent codewords will not be decoded successfully and, if decoded at all, will receive low decode confidence levels. The decoder tests confidence levels of adjacent decoded codewords to determine at step 120 if the scan line is aligned with the bar code. If the decoded codewords have high confidence levels, the decoder asserts at step 122 the active low TRIG2 signal (FIG. 4b) to the scanner and changes the slab laser pattern to a raster laser pattern shown in FIG. 6b. The raster pattern is requested by the decoder to acquire the bar-space data that resides in other parts of the 2-D bar code not previously covered by the smaller slab laser pattern. If the scanner is not aligned, the step 124 is performed to continue scanning with the slab laser pattern.

The process continues to check if more scans are available for decoding. If none are available at any time, the decoding process exits this routine.

Once the decoder has successfully recognized and decoded the bar code being scanned, the microprocessor 76 (FIG. 5) deactivates the TRIG2 signal and directs the switch network 78 to turn off the +12 V, −12 V and +5 V power supply signals. This action causes the scanner mechanism to stop and the laser to turn off. In addition the microprocessor 76 directs the scanner interface circuit 84 to send the DECODE signal (FIG. 4g) to the scanner in order to produce audio and/or video indication that the bar code is successfully decoded.

Figure 6B:
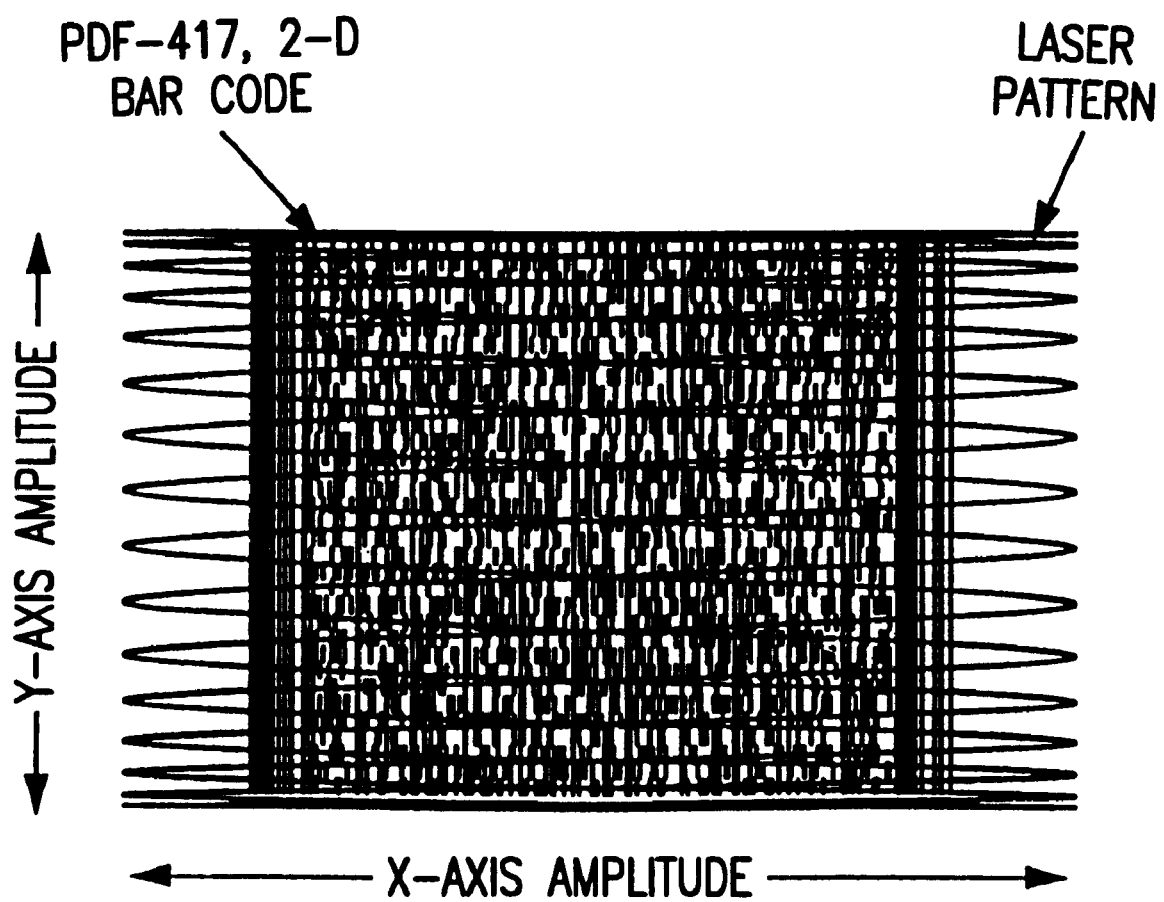

The decoder controls the opening rate and the amplitude of the y-axis component of the raster pattern by controlling the duty cycle of the TRIG2 signal. The optimal size of the raster pattern generated is one such that it just covers but does not substantially overlap the entire PDF symbol, as shown in FIG. 6b. Since PDF and other two-dimensional symbols may be generated in many sizes and aspect ratios depending on the data encoded therein, it is required to be able to adjust the y-axis amplitude in accordance with the particular symbol being scanned, rather than simply presetting a y-axis value which would remain unchanged for each two-dimensional scan.

Disadvantageously, such a use of a predetermined and unchangeable raster size would require that the raster pattern be made large enough to encompass all possible two-dimensional PDF symbols which are expected to be scanned. Such a large raster pattern will necessarily overlap those PDF symbols which are smaller than the maximum anticipated size, which results in inefficient and slow scanning and decoding. In addition, it is important for the scanning system to be able to adjust the raster size dynamically so that variations in scanning distances (as a result of different operators and different scanning environments) will be automatically correctable and will yield the optimal scanning of the present invention.

Figure 9:
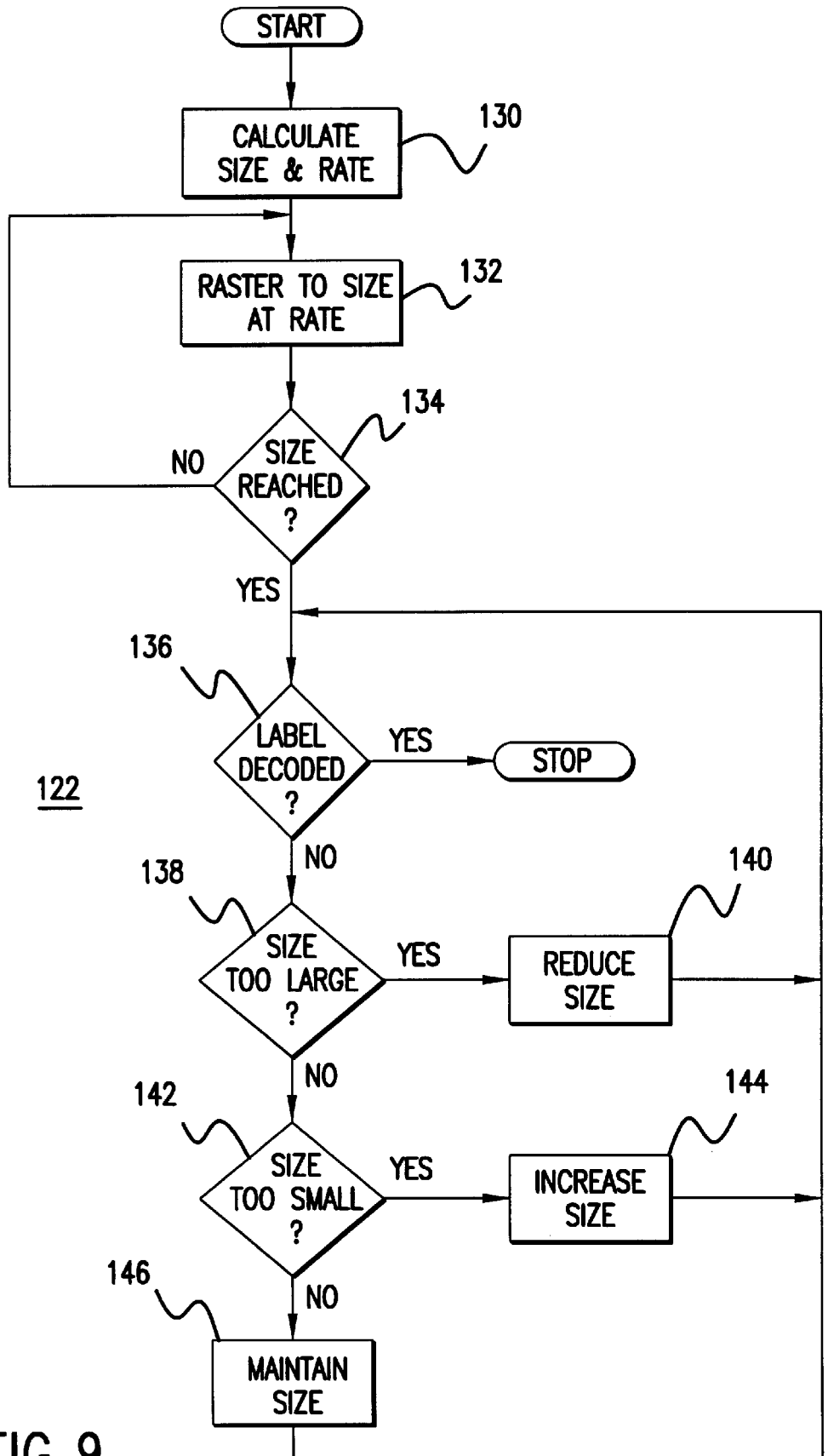
FIG. 9 is a flow-chart of the raster pattern change procedure.

As previously described, the slab laser pattern is changed to a raster laser pattern in step 122 of FIG. 8. Step 122 is flow described in detail with reference to the flowchart of FIG. 9. At step 130, the final y-axis amplitude of the raster pattern is calculated by using the initialization matrix size ascertained in step 108 of FIG. 8. That is the number of rows contained in the particular PDF symbol being scanned is known from step 108, and this information is used to determine how high the y-axis amplitude of the raster pattern must be in order to fully capture the-target PDF symbol. In addition, the decoder uses this information to calculate the rate of change of the y-axis amplitude in accordance with the initial slab size and the desired final raster pattern size.

The duty cycle of the TRIG2 signal is then controlled by the decoder such that the scanner will increase the y-axis amplitude of the raster pattern to the desired size at the rate calculated in step 132. Step 134 will ensure that the calculated raster size has been reached before proceeding.

Step 136 monitors the decode status of the PDF symbol, and if it is decoded the loop is exited. If the symbol has not been decoded then the process continues and step 138 checks that the size of the raster pattern is not too large. The decoder will detect that the raster pattern has overshot the target symbol and is therefore too large when it ceases decoding PDF start/stop characters and/or row indicators. In additions the decoder will detect that the raster pattern has overshot the target symbol when it detects the white guard bar space around the symbol and sees no black bars in the DBP signal.

If the decoder detects that the raster pattern is too large, then the duty cycle of TRIG2 will be appropriately varied in order to decrease the size of the raster at step 140.

Similarly, the decoder will check at step 142 to ensure that the final raster pattern is not too small. If the decoder detects that the first and/or last rows of the target symbols have not been read, then the raster is too small and the duty cycle of TRIG2 will be varied accordingly at step 144 in order to correct the raster pattern size.

Although the use of the precalculated PDF symbol size will allow the raster pattern to increase to approximately the proper size, the raster may overshoot or undershoot the target symbol in situations where the distance from the scanner to the symbol varies, and the resulting raster pattern covers more or less space than required. Thus, by continually checking the PDF-specific characters, the decoder may vary the duty cycle of TRIG2 appropriately in order to dynamically correct the raster pattern to optimally fit the particular PDF symbol being scanned.

If the raster pattern is not deemed to be too large or too small at steps 138 and 142, respectively, then the decoder maintains the raster size at step 146 and re-enters the loop at step 136 to see if the symbol is decoded, etc.

Figure 10:
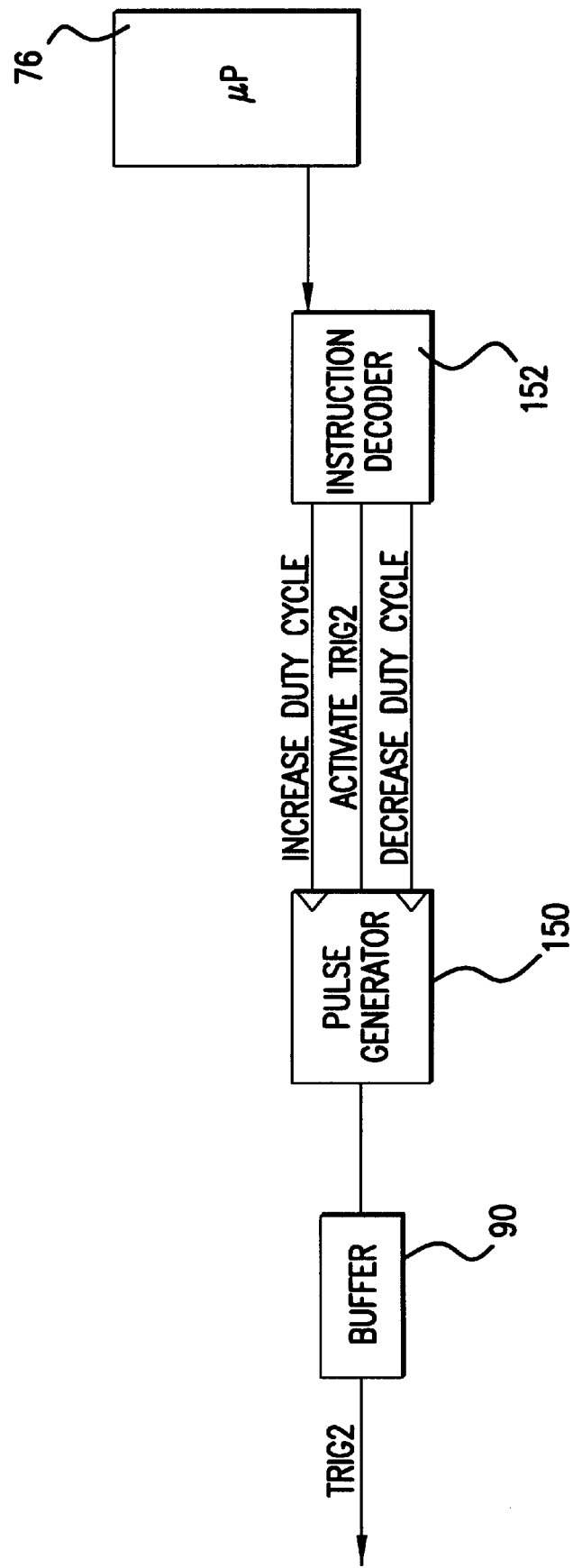
FIG. 10 is a schematic drawing of a circuit for generating and controlling a raster pattern change signal.

Control of the duty cycle of the TRIG2 signal can managed by the microprocessor 76 in accordance with the above described process through software control of the signal, or by the use of an add-on hardware circuit as shown in FIG. 10.

FIG. 10 illustrates the use of a pulse generator circuit 150 and instruction decoder 152 coupled between the microprocessor 76 and buffer 90 of FIG. 5. The pulse generator 150 and instruction decoder 152 are assembled with logic gates and the like well known in the art and generate the TRIG2 signal when instructed by the microprocessor 76. As previously described, the microprocessor will activate TRIG2 when the target bar code is determined to be a 2-D code. This is accomplished by sending an appropriate instruction to the instruction decoder 152, which in turn triggers the pulse generator 150 to activate TRIG2. When the microprocessor 76 determines that the duty cycle of TRIG2 must be modified in order to enlarge or reduce the raster pattern, the microprocessor issues the appropriate instruction to the instruction decoder 152, which in turn instructs the pulse generator 150 to increase or decrease the duty cycle of TRIG2 as required.

In the alternative, a the TRIG2 signal may be driven by the microprocessor directly without the use of the pulse generator 150 and instruction decoder 152. Referring to FIG. 5, the microprocessor is coupled directly to the output buffer 90 to control TRIG2 by software control. In this alternative embodiment, an internal timer of the microprocessor 76 is used to generate interrupts on each edge of the TRZG2 waveform. In this interrupt service routine, the microprocessor 76 changes the state of the TREG2 signal and than sets the timer for an interval equal to the duration of the next phase of the waveform.

Although the use of the alternative software process embodiment eliminates the need to use additional hardware to control TRIG2, this embodiment requires the microprocessor to service interrupts on a regular basis, even if the duty cycle of TRIG2 is not changed during the decode phase. This additional overhead load on the microprocessor results in a slower decode time. The hardware based embodiment of FIG. 10, however, requires microprocessor instructions only when the duty cycle is modified. Thus, the use of the hardware circuit described herein is preferred since it operates relatively fast and does not use overhead as in the software embodiment.

There accordingly has been described a methods of and apparatus for interfacing the bar code scanner to the digital decoder so as to provide automatic recognition, reading and decoding of different one-dimensional and two-dimensional bar codes.

In this disclosure there is shown and described only the preferred embodiment of the invention, but it is to be understood that the intention is capable of changes and modifications within the scope of the inventive concept as expressed herein.

We claim:

1. Apparatus for interfacing decoding means to scanning transducing means forming a digital code signal representing a target being scanned, comprising:

means for transferring an actuating signal from the transducing means to the decoding means, means for transferring an action signal from the decoding means to the transducing means in response to the actuating signal for activating the transducing means, means for transferring the digital code signal and a scanning direction signal from the transducing means to the decoding means in response to the action signal, means for transferring a scanning control signal from the decoding means to the transducing means to control scanning of the transducing means when the non-decoded digital code signal and the non-decoded scanning direction signal indicate that the target requires the transducing means to modify scanning, and means for transferring an acknowledge signal from the decoding means to the transducing means in response to the digital code signal and the scanning direction signal, wherein said acknowledgment signal represents a status of decoding the digital code symbol.

2. The apparatus of claim 1 wherein said means for transferring a scanning control signal comprises means for transferring a setting signal to set two-dimensional scanning of the transducing means.

3. The apparatus of claim 1, wherein the means for transferring an acknowledge signal comprises means for transferring an indicator drive signal to indicate current status of the decoding means.

4. The apparatus of claim 3, wherein the means for transferring an indicator drive signal provides audible indication of the current status of the decoding means.

5. The apparatus of claim 3, wherein the means for transferring an indicator-drive signal provides visible indication of the current status of the decoding means.

6. The apparatus of claim 3, wherein the means for transferring an indicator drive signal provides indication of successful decoding of the digital code signal.

7. The apparatus of claim 3, wherein the means for transferring an indicator drive signal provides indication of a malfunction condition of the decoding means, transducing means and interface.

8. The apparatus of claim 1, wherein the means for transferring an actuating signal comprises means for transferring an internal triggering signal to trigger the transducing means from a local source and means for transferring an external triggering signal to trigger the transducing means from a remote location.

9. The apparatus of claim 1, wherein the scanning transducing means comprises a bar code scanning means for forming a digital bar code signal representing bars and spaces of a bar code being scanned by the bar code scanning means.

10. The apparatus of claim 9, wherein the means for transferring the digital code signal and a scanning direction signal comprises means for transferring the digital bar code signal and a bar code scanning direction signal.

11. The apparatus of claim 10, wherein the means for transferring a scanning control signal comprises means for transferring a signal to change scanning pattern if the digital bar code signal and the bar code scanning direction signal indicates that the bar code comprises a two-dimensional component.

12. The apparatus of claim 1, wherein the means for transferring an action signal comprises means for transferring a power supply signal to supply the transducing means with electric power.

13. Apparatus for interfacing decoding means to scanning transducing means forming a digital code signal representing a bar code target being scanned, comprising:

determining means responsive to said digital code signal for determining values of said digital code signal, addressing means responsive to a scanning direction signal for designating a first memory area for storing the values of said digital code signal corresponding to a scan of said scanning transducing means, and writing means for writing said values in said first memory area and for writing said first memory area designation in a second memory area, said decoding means including processing means for locating said values written in said first memory area utilizing said first memory designation written in said second memory area for identifying said target to be of a particular symbology type responsive to said values.

14. The apparatus of claim 13, wherein said addressing mean comprises an address pointing means for designating a memory location in said memory area for storing a first value of said digital code signal after a transition of said scanning direction signal.

15. The apparatus of claim 13, wherein said digital code signal comprises a plurality of components corresponding to bars and spaces of said bar code target.

16. The apparatus of claim 15, wherein said determining means comprises means for measuring the widths of said components.

17. The apparatus of claim 16, wherein said writing means writes into said memory area the widths of said components corresponding to one scan of said scanning means.

18. A method of interfacing a digital decoder to a bar code scanner forming a code signal representing a bar code target being scanned by the bar code scanner, said method comprising the steps of:

determining values of said code signal, designating a first memory area for storing the values of said code signal corresponding to a scan of said bar code scanner in response to a scanning direction signal, writing said values in said first memory area and writing said first memory area designation in a second memory area, and locating said values written in said first memory area utilizing the first memory area designation written in said second memory area and reading said values from said first memory area for identifying said target to be of a particular symbology type.

19. The method of claim 18, wherein said step of designating comprises the step of designating a memory location in said memory area for storing a first value of said code signal after a transition of said scanning direction signal.

20. The method of claim 18, wherein said digital code signal comprises a plurality of components corresponding to bars and spaces of said bar code target and said step of determining comprises the step of measuring the widths of said components.

21. The method of claim 20, wherein said step of writing comprises the step of loading into said memory area the widths of said components corresponding to one scan of said bar code-scanner.

* * * * *

UNITED STATES PATENT AND TRADEMARK OFFICE
CERTIFICATE OF CORRECTION

PATENT NO. : 5,920,059
DATED : July 6, 1999
INVENTOR(S) : John Barile, Hal Charych, Steven Chew, James Giebel It is certified that error appears in the above-identified patent and that said Letters Patent are hereby corrected as shown below:

COVER PAGE, INVENTORS SECTION: Correct spelling of fourth inventor from Geibel to Giebel.

Signed and Sealed this

Fourteenth Day of December, 1999

Attest:

Q. TODD DICKINSON

Attesting Officer     Acting Commissioner of Patents and Trademarks